United States Patent
Breed et al.

(10) Patent No.: US 6,595,883 B1
(45) Date of Patent: Jul. 22, 2003

(54) V-BELT FOR CLUTCHING DRIVE APPLICATIONS

(75) Inventors: John A. Breed, Littleton, CO (US); David D. Holtz, Englewood, CO (US); Susan K. Welk, Lakewood, CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/612,329

(22) Filed: Jul. 6, 2000

(51) Int. Cl.[7] ............................. F16G 1/10; F16G 5/04
(52) U.S. Cl. .................... 474/263; 474/260; 156/137
(58) Field of Search ............................. 474/260–267, 474/250; 156/137, 141, 140; 139/415, 426 R; 403/404; 285/187, 229

(56) References Cited

U.S. PATENT DOCUMENTS

| | | | |
|---|---|---|---|
| 3,818,741 A | 6/1974 | Terhune | |
| 3,871,240 A | 3/1975 | Schnackenberg et al. | |
| 3,987,684 A | * 10/1976 | Fisher et al. | 474/265 |
| 3,995,507 A | * 12/1976 | White et al. | 156/140 |
| 4,024,773 A | 5/1977 | Hartman et al. | |
| 4,407,333 A | * 10/1983 | Fowkes | 474/267 |
| 4,481,051 A | * 11/1984 | Imamura et al. | 156/137 |
| 4,598,013 A | 7/1986 | McGee, Jr. | |
| 4,682,973 A | 7/1987 | Fujita et al. | |
| 4,775,357 A | 10/1988 | Wolfe | |
| 4,798,566 A | 1/1989 | Sedlacek | |
| 4,869,711 A | 9/1989 | Komai | |
| 4,936,814 A | 6/1990 | Colley et al. | |
| 4,937,925 A | 7/1990 | McGee, Jr. | |
| 5,716,158 A | * 2/1998 | Hahn et al. | 403/404 |

FOREIGN PATENT DOCUMENTS

| | | |
|---|---|---|
| EP | 40908 A1 | * 12/1981 |
| WO | WO 0134998 A1 | * 5/2001 |

* cited by examiner

*Primary Examiner*—Marcus Charles
(74) *Attorney, Agent, or Firm*—M. S. Olson, Esq.; C. H. Castleman, Esq.; S. G. Austin, Esq.

(57) ABSTRACT

A V-belt suitable for use in clutching-type applications, comprising a belt body 10 having a compression section 14 and a tension section 12; at least one longitudinally extending tensile element 26 disposed between said sections 14, 12; said compression section 14 having an inner portion 18 and an outer portion 20, at least said outer portion 20 comprising at least three layers of a rubberized textile member 30, said rubberized textile members each comprising a textile component 33 and a rubber component 31, and characterized in that at least a greater proportion by weight of said textile component 33 is orientated in a first direction other than both the direction of travel of the belt and the direction transverse thereto.

10 Claims, 2 Drawing Sheets

V-BELT FOR CLUTCHING DRIVE APPLICATIONS

BACKGROUND OF THE INVENTION

1. Field of the invention

The present invention relates to power transmission belts and in particular to raw-edged V-belts suitable for use in clutching applications.

2. Description of the Related Art

V-belts are commonly used to transmit power as between pulleys. V-belts, characterized by a substantially trapezoidal cross section and generally comprising elastomeric tension- and compression sections and a load-carrying section disposed between the tension- and compression sections, are also commonly utilized in clutching-type drive applications, wherein the V-belt is alternately made to establish and disengage from a power transmitting function between two pulleys, such as by a cam, an idler pulley, through the use of a clutch sheave or a movable clutching center, or by any other conventional mechanism well known to the art.

Of concern in clutching-type drive systems is the incremental time of clutching, i.e., of engagement and of disengagement of the belt from the balance of the drive system, i.e., from its power transmitting function. Peripheral component protection, operator safety and convenience often call for the incremental time of clutching to be extended so that high inertial torque forces are not transmitted to the component operated by the drive system, or to the operator of such component; e.g., of the rider lawn mower or the tiller.

In conventional raw-edged- or non-banded V-belts, one or more layers of rubberized fabric is provided on at least one of the outer surface of the tension section and the outer surface of the compression section, but the side edges of the belt are raw, i.e., remain uncovered. These rubberized fabric elements decrease the amount of belt rubber contacting the sheave sidewalls during use, by substituting layers of rubber with layers of fabric, thus reducing the overall coefficient of friction of the side-wall-engaging belt surface and reducing the belt's aggressiveness. Because the sidewalls are uncovered and large portions of the compression section elastomer remain exposed however, raw edged V-belts are usually sidewall-aggressive in clutching applications, and result in rapid engagement during the de-clutching procedure. Such rapid engagement maximizes the aforementioned high inertial torque forces.

Moreover, raw-edged V-belt sides are exposed to high degree of abrasion in clutching drive systems, and the gum compounds typically used to skim the fabric elements thus experience a high degree of wear in the area in which the rubberized fabric element or member contacts the pulley, i.e., at the fabric edges. This leads to uneven V-belt side surface wear, voids between lamination fabric layers, and non-uniform V-belt to pulley sidewall fit, which leads to a deterioration of proper engagement characteristics. In addition, conventional raw-edged V-belts generally exhibit poor reverse bending properties.

SUMMARY OF THE INVENTION

The present invention provides a raw-edged V-belt for clutching-type drive applications, comprising a belt body having a compression section and a tension section and a load-carrying section disposed between the tension- and compression sections and comprising at least one longitudinally extending tensile element. The compression section possesses an outer portion and an inner portion, at least the outer portion comprising three or more layers of a rubberized textile member.

The rubberized textile members comprise a textile component and a rubber component, and in at least one of the rubberized textile member layers, the textile component is formed and arranged such that at least the greater proportion of the total textile component is orientated in any one direction exclusive of both the direction of travel of the belt and its transverse. This arrangement in at least one of the V-belt's rubberized textile member layers results in a structural imbalance in the V-belt, which causes the belt to exhibit favorable engagement and disengagement characteristics in clutching applications.

In a preferred embodiment of the present invention, at least one of the rubberized textile member layers comprises a knitted or woven fabric element coated on at least one side with a rubber and fiber composite. According to this preferred embodiment of the invention, the fibers in the rubber and fiber composite improve the abrasion resistance of the belt, thus decreasing the occurrence of poor pulley-to-sidewall fit with extended use of the belt in clutching-type applications. According to a further preferred embodiment, at least a greater proportion of the fibers in the rubber and fiber composite are orientated in a direction other than the belt's direction of travel or its transverse.

Another feature of the present invention is to provide a belt of the type herein described which may be used satisfactorily in applications characterized by reverse bending conditions.

A clutching-type drive assembly is moreover provided, comprising a belt of the present invention trained about at least one driver pulley and at least one driven pulley, and further comprising a clutching member.

A method of improving the engagement and disengagement characteristics of a V-belt in clutching applications is moreover provided, characterized by the orientation or alignment of at least the greater proportion of the textile component in at least one of the rubberized textile member layers of a V-belt compression section outer portion, in a first direction, which is distinct from both the direction of travel of the V-belt and the transverse thereof.

BRIEF DESCRIPTION OF THE DRAWINGS

The accompanying drawings, which are incorporated in and form a part of the specification, illustrate preferred embodiments of the invention, and together with the description, serve to explain the principles of the invention. In the drawings, like numerals denote like parts and.

DETAILED DESCRIPTION

Figure 1:
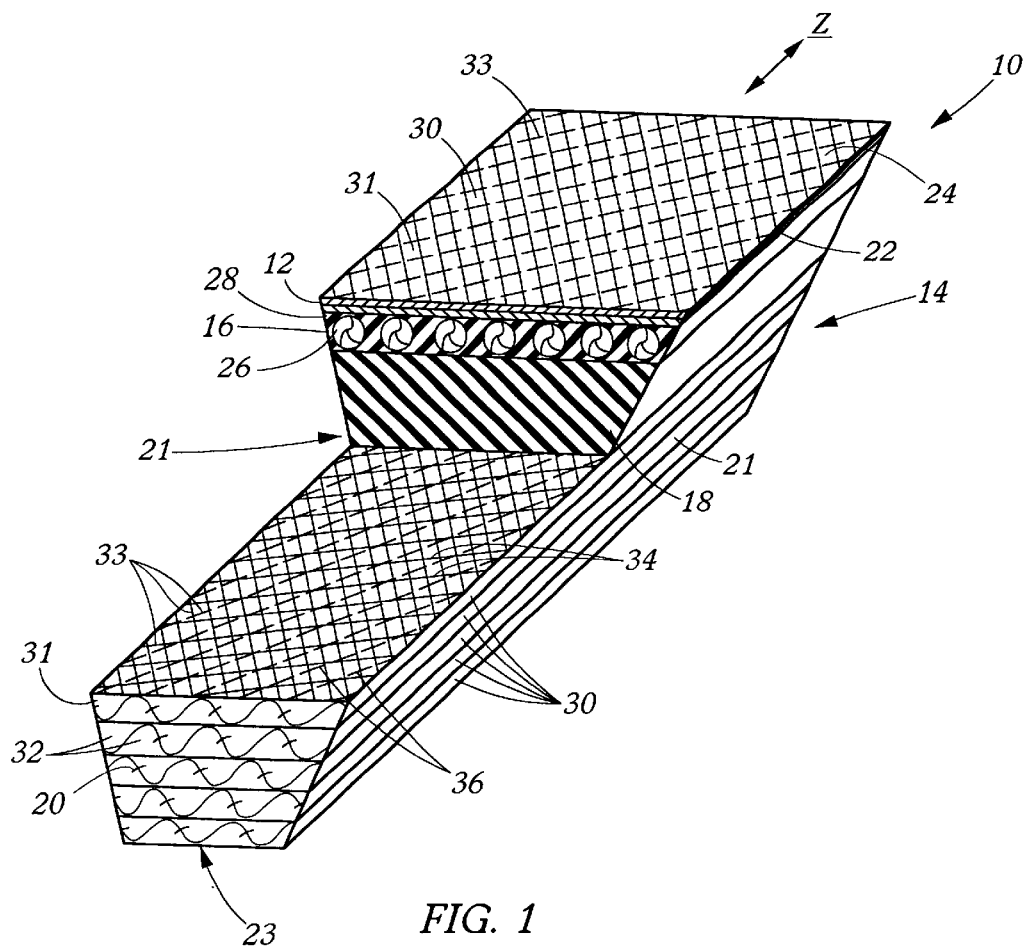
FIG. 1 is a partially cut-away perspective view of a raw-edged V-belt according to an embodiment of the present invention.

Referring to FIG. 1, a raw-edged V-belt 10 in accordance with an embodiment of the present invention is shown generally. The V-belt 10 includes a tension section 12, and a compression section 14 having an inner portion 18 and an outer portion 20, and a load-carrying section 16 disposed between the tension section 12 and the compression section 14 and comprising at least one longitudinally extending tensile cord 26 embedded in an elastomeric material 28 that may be made of any suitable material such as neoprene gum or the like.

In the exemplary belt shown in FIG. 1, the V-belt 10, being in the form of a substantially trapezoidal structure, possesses raw-edged non-parallel sides, each designated generally by the same reference numeral 21. As in any conventional V-belt, the side edges 21 of the belt 10 serve as the driving surfaces of the V-belt 10. In the particular embodiment shown in FIG. 1, the outer portion 20 of the compression section 14 has a generally flat surface 23.

The outer portion 20 of the belt's compression section 14 is formed of at least three layers of a rubberized textile member 30. The rubberized textile members 30 comprise a textile component 33 and a rubber component 31. The rubberized textile to member layers useful in the practice of the present invention are described in further detail below.

In the particular embodiment shown, the tension section 12 similarly comprises an inner portion 22 and an outer portion 24. In this embodiment, the outer portion 24 of the belt's tension section 12 is formed of one or more layers of a rubberized textile member 30, similarly comprising a textile component 33 and a rubber component 31 as described in further detail below.

The inner portion 22 of the tension section 12 or overcord and the inner portion 18 of the compression section 14 or undercord may be formed of the same or different materials, which may be of any conventional and/or suitable elastomer composition, including those formed from castable and non-castable elastomers, and which may beneficially constitute a conventional general purpose rubber. Throughout this disclosure, the term, "castable elastomer" will be used to denote that type of material which is substantially liquid as it is introduced into a belt mold cavity, and is thereafter cured or polymerized. Such materials may include polyurethanes, polyurethane/ureas, etc. The term, "non-castable elastomer" will be used to denote that material that is substantially solid as it is formed into the elastomeric portions of the belt, and is thereafter cured or vulcanized. Non-castable elastomers which may be utilized in either the tension section 12 or compression section 14 of the belts of the present invention include for example polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, butadiene rubber (BR), natural rubber (NR), ethylene propylene copolymers (EPM), and ethylene propylene diene terpolymers (EPDM).

To form the inner portions of the belts' tension section 12 and/or compression sections 14, the elastomers are preferably blended with conventional rubber compounding ingredients including fillers, plasticizers, vulcanization agents or curatives, and accelerators in amounts conventionally employed. One skilled in the relevant art would readily appreciate any number of such compositions. A number of suitable elastomer compositions are described for example in The R. T. Vanderbilt Rubber Handbook (13$^{th}$ ed., 1996). In a preferred embodiment, the elastomeric portions of both the tension section 12 and compression section 14 are formed of the same elastomeric composition, which is preferably of an HNBR, CR, SBR or EPDM composition (or a blend of two or more thereof).

The elastomeric portions of the inner portion 22 of the tension section 12 and the compression section's inner portion 18 may moreover be fiber loaded as is well known in the art, utilizing materials such as cotton, polyester, rayon, fiberglass, aramid and nylon, in such forms as staple- or chopped fibers, flock or pulp, in amounts generally employed, preferably such that a substantial portion of the fibers are formed and arranged to lie in a direction generally transverse the direction of travel of the belt.

The tensile cord(s) 26 of the load-carrying section 16 may similarly be formed of any suitable and/or conventional material, including aramid, nylon, polyester, fiberglass, carbon fiber, etc. It may be of any suitable and/or conventional form, including braid, wire, cord, etc. In a preferred embodiment, the tensile member is formed of one or more polyester or aramid cords helically wrapped and generally embedded in the tension section 14, extending in the direction of travel of the belt.

Figure 2:
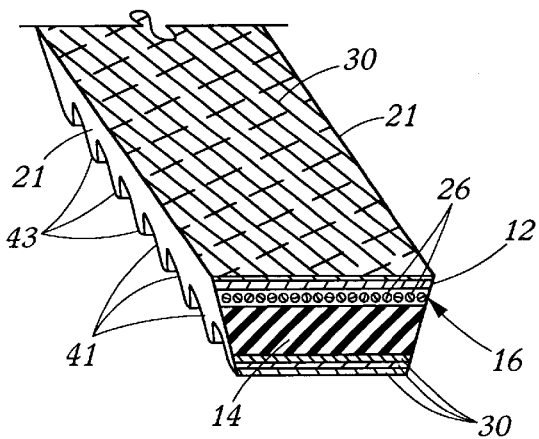
FIG. 2 is a partially cut-away perspective view of a raw-edged V-belt according to another embodiment of the present invention.

Referring to FIG. 2, a notched V-belt 10 in accordance with the present invention is illustrated. The V-belt 10 includes a tension section 12 similar to that illustrated in FIG. 1, a load-carrying section 16 comprising one or more tensile cords 26, also similar to those illustrated in FIG. 1, and a compression section or undercord 14, also similar to that illustrated in FIG. 1. The materials for the various V-belt constituent members are similarly as set forth above for FIG. 1.

In the embodiment of FIG. 2 however, the compression section's outer portion 20 possesses a surface configuration in the form of alternating notch depression surfaces or troughs 41 and toothed projections 43. These alternating notched depression surfaces 41 and tooth projections 43 preferably follow a generally sinusoidal path as illustrated which serves to distribute and minimize bending stresses as the compression section 14 passes around pulleys and sheaves, which may be desirable in some applications as one skilled in the relevant art would readily recognize.

Turning now to a description of the rubberized textile member 30 useful in the practice of the present invention, each said member, whether utilized in the outer portion 24 of the tension section 12 or the outer portion 20 of the compression section 14, comprises a textile component 33 and a rubber or elastomer component 31.

For the elastomer component 31 of the rubberized textile members 30, any suitable or conventional elastomer composition may be employed, any number of which are well known in the art, and including those set forth above for the inner portions of the tension section 12 and compression section 14, provided the composition is compatible with the intended application and the surrounding belt materials, and exhibits adequate adhesion to the latter. Such materials may generally comprise a base polymer or polymers, fillers, plasticizers, vulcanization agents or curatives, and accelerators in amounts conventionally employed. One skilled in the relevant art would readily appreciate any number of such compositions. In a preferred embodiment of the invention, the elastomer component 31 is formed of the same elastomer composition as that forming the inner portion 18 of the compression section 14, but may or may not include the same or similar fiber-loading as that which may be present in those inner portions.

For the textile component 33 of the rubberized textile members 30, any suitable and/or conventional type of textile material may be employed, including fibers and filaments, such as staple-, cut-, chopped- or pulped fibers and filaments; yarn and yarn intermediates; cord; braid; and fabric, including weaves consisting of warp and weft threads at any desired angle, knits and non-woven fabrics. Such materials may be utilized singly by type or in combinations of two or more types for utilization as the textile component. Woven fabrics 34, as shown for example in FIG. 3, may be preferably cut or otherwise formed on a bias so that the strands form an angle with the direction of travel of the belt. In the practice of the present invention, the textile component may be of any natural or synthetic variety, including but not limited to aramid, polyamide (including nylon), fiberglass, polyester, carbon fiber, cotton, jute, and hemp.

In accordance with an embodiment of the present invention, the rubber component 31 and textile component 33 may be utilized in any combination of types, materials, amounts, and configurations, provided sufficient imbalance is established in the V-belt to create a tendency toward bending distortion, particularly of the undercord section, such that the belt exhibits a beneficial delay in engagement and disengagement, without negatively impacting the performance of the V-belt or the drive once the belt is fully seated in its engaged position. According to a preferred embodiment of the present invention as shown in FIGS. 1–3, such imbalance is introduced in the V-belt's structure by increasing the proportion, i.e., the number and/or weight, of the textile component 33 that is aligned or orientated in one direction vis-à-vis the longitudinal- or direction of travel of the belt, in at least one of the rubberized textile member layers 30 forming the compression section's outer portion 20.

Figure 3:
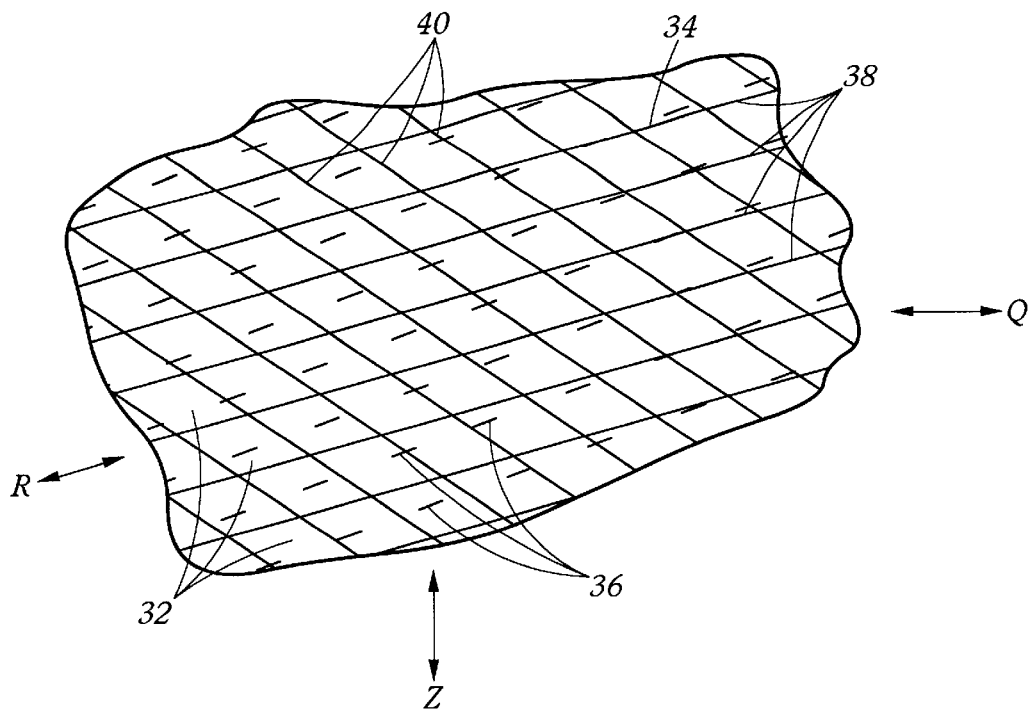
FIG. 3 is a top view of a portion of the rubberized fabric member shown in FIG. 1, comprising a fabric treated with a rubber and fiber composite, according to an embodiment of the present invention.

As a non-limiting example of the foregoing, as illustrated in FIG. 3, at least one, and preferably each of the at least three rubberized textile member layers 30 forming the outer portion 20 of the compression section 14 preferably comprises a fabric member 34 having a rubber skim-coat on at least one but preferably on both sides as shown, formed of a rubber and fiber composite. The rubber and fiber composite in turn comprises any conventional and/or suitable rubber or elastomeric composition 32, and a suitable quantity and configuration of fibers 36. The rubber composition 32 constitutes the rubber component 31 according to this embodiment, and may be formed of any material conventionally and/or suitably employed to skim V-belt fabric cover elements for use in raw-edged or wrapped V-Belt configurations, any number of which may be found for example in aforementioned R. T. Vanderbilt Rubber Handbook. Such rubber compositions may for example be based on styrene butadiene rubber (SBR); butadiene rubber (BR); acrylonitrile butadiene rubber (NBR); hydrogenated acrylonitrile butadiene rubber (HNBR); ethylene propylene copolymers and terpolymers, polychloroprene (CR), natural rubber (NR), alkylated chlorosulfonated polyethylene (ACSM), etc., or suitable combinations of two or more of the foregoing, but in a preferred embodiment of the invention, the rubber composition 32 is formed of the same composition as that utilized in the inner portion 18 of the compression section 14 of the belt.

The fibers 36 in the rubber and fiber composite of the embodiment of the invention illustrated in FIG. 3 may be of any conventional or suitable material or form, including for example materials such as cotton, polyester, aramid, nylon and fiberglass; and in forms including chopped fibers, pulped fibers, flocked fibers, but are preferably at least semi-linear in configuration. The fibers 36 may moreover be treated with sizing, an adhesive, or other conventional and/or suitable fiber treatments as are well known in the art. In a preferred embodiment, the fibers are of an untreated natural cotton flock variety, and possess an average length in the range of from about 0.1 to 5.0 mm, more preferably of from about 0.2 to about 3 mm, and most preferably of from about 0.5 to about 1.5 mm. The rubber and fiber composite according to the preferred embodiment of the present invention shown preferably comprises from about 0.1 to about 25 parts per hundred weight of elastomer ("phr") of fiber; more preferably of from about 0.5 to about 20 phr, and most preferably from about 4 to about 15 phr of fiber.

In a further preferred embodiment of the present invention, at least a portion, and preferably at least a majority of the fibers 36 in the rubber and fiber composite are arranged and formed or are otherwise orientated to lie in a direction other than both with the direction of travel of the belt Z, and its transverse Q. Where the textile component 33 of one or more of the rubberized textile members 30 preferably comprises a woven or knitted fabric member 34 composed of at least one warp yarn 38 and one weft yarn 40, the fibers may, but need not be orientated in a direction substantially the same as that of the warp 38, as shown in FIG. 3. In a preferred embodiment of the present invention, the fabric member 34 comprises a nylon/cotton blend bias-fabric weave, such as that presently available under the trade mark, FLEX-WEAVE, by The Gates Rubber Company of Denver, Colo.

In a preferred embodiment the V-belt of the present invention includes at least three and preferably more than four layers of rubberized textile members 30 to form the outer portion 20 of the V-belt's compression section 14. As shown in one embodiment as FIGS. 1 and 2, the outer portion 20 of the V-belt 10 includes five such layers 30. Where less than three layers of rubberized textile members have been utilized in the compression section outer portion, the desirably delayed engagement and disengagement characteristics have not been observed. Such structures, i.e. the incorporation of one or two such layers, have however been shown to increase the resistance of the belt to crack initiation and propagation in the relevant area.

As a non-limiting example of the foregoing, a V-belt was constructed according to the provisions of the present invention, in which the rubberized textile member 30 comprised a bias-fabric weave available from The Gates Rubber Company under the trade mark, FLEX-WEAVE, in which the warp was at an angle of about 115° to the weft direction, and about 57° degrees to the direction of travel, or longitudinal direction Z, of the belt. According to this same example, the rubber and fiber composite used to skim-coat the bias-cut fabric was formed of a conventional gum rubber composition and approximately 7 phr of cotton flock fibers having a bulk density of from about 4.5 to about 5.5 cc/gm, and an average length of about 320 microns. At least a significant amount of the fibers 36 according to this embodiment were oriented in a direction of about 57°±7° to the direction of travel, or longitudinal direction Z of the belt, and were generally aligned in roughly the same direction as the warp yarns 38 of the fabric member 34 as shown. According to this embodiment then, the bias-fabric weave and the fiber loading formed the textile component of the rubberized textile member, and the elastomer composition in the rubber and fiber composite formed its elastomer component.

Generally, where such bias-cut fabric is utilized in combination with semi-linear fiber loading in a rubber skim coat on the fabric, the fabric's warp preferably lies at an angle of from about 100 to about 130 degrees to the weft; more preferably of from about 108 to about 122 degrees to the weft; and most preferably of from about 110 to about 120 degrees to the weft. According to this embodiment, the warp preferably lies at an angle of from 15 to less than 90 degrees to the longitudinal direction of the belt; more preferably of from about 40 to about 80 degrees to the longitudinal direction of the belt; and most preferably of from about 50 to about 65 degrees to the longitudinal direction of the belt. According to this embodiment, at least the greater proportion and preferably a significant amount of the fiber in the fiber-loaded skim coat rubber is preferably orientated to lie at an angle of from 15 to less than 90 degrees to the longitudinal direction of the belt; more preferably of from about 40 to about 80 degrees to the longitudinal direction of the belt; and most preferably of from about 50 to about 65 degrees to the longitudinal direction of the belt. According to this embodiment, the fiber in the fiber-loaded skim coat rubber is preferably orientated to lie in a direction +/−20 degrees from the direction of the warp; more preferably of +/−15 degrees from the direction of the warp; and most preferably of +/−10 degrees from the direction of the warp.

As further shown in the exemplary embodiments of FIGS. 1 and 2, the several layers of rubberized textile members 30 are also preferably unbalanced, i.e., in each layer, the textile component (i.e., the combination of fabric warp 38 and weft yarns 40 and fibers 36 in the rubber and fiber composite) is arranged such that a greater proportion thereof is oriented in the same, or "first", direction R vis-à-vis the longitudinal direction of the belt Z. In the example shown, at least a substantial portion of the fibers 36 are orientated or aligned substantially in the same direction as the warp yarns 38, which, in the case of the fabric 34 shown, are of substantially the same weight and proportion as the weft yarns 40, but need not necessarily be so. While this configuration has been found to be optimal for the particular embodiment shown, it should be readily appreciated by one skilled in the art that other configurations could similarly be employed, provided a sufficient textile component weight imbalance is imparted to ensure a beneficially delayed engagement (and disengagement) without negatively impacting the performance of the belt (or drive) once the belt is fully seated.

Figure 4:
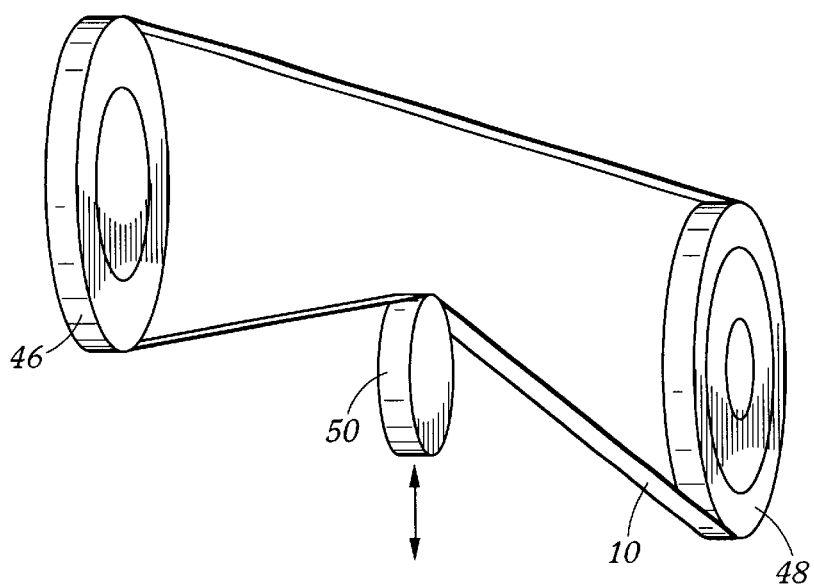
FIG. 4 is a schematic perspective view of a clutching-type drive assembly of one embodiment of the present invention, incorporating a V-belt trained about one driver pulley, one driven pulley, and incorporating one clutching member.

By introducing a structural imbalance in compression section or undercord of the V-belt of the subject invention, one imparts in the belt a tendency to exhibit a beneficial delay in engagement and disengagement from a power transmitting function in a clutching-type drive assembly as shown for example in FIG. 4 (comprising a V-belt 10, at least one driver pulley 46, at least one driven pulley 48, and at least one clutching member shown in the form of a cam 50), when induced to so engage or disengage by the clutching member. The imbalance results in bending distortion of the belt's undercord, which has been found to delay uniform contact of the V-belt with the pulley groove surface when the belt is induced (such as by a cam, idler, etc) to establish or disengage from a power transmitting position in a clutching drive assembly, in turn enhancing the smoothness of the V-belt-to-pulley engagement and disengagement actions. Once the engagement step is complete and normal operating tensions of the V-belt in the engaged position are achieved, it has been found that the effects of the bending distortion become minimal. At that point, the V-belt is believed to be substantially fully seated within the pulley groove, and the drive system operates smoothly with little or no adverse effect resulting from the imbalance in the compression section outer portion.

One skilled in the relevant art would readily recognize that the type, size, amount, weight, and configuration of the several components of the rubberized textile laminations may be varied with the particular application, drive configuration and environment, to allow for sufficient distortion without negative impact on the actual drive performance. It is anticipated for example, that directionally-orientated fiber-loaded rubber as described above may be utilized to skim-coat non-woven fabrics or knitted fabrics; that weighted square woven or tire cord fabrics (i.e., where the weight and/or proportion of the warp greatly exceeds that of the weft yarns) may be employed alone or with additional directionally-orientated fiber-loaded rubber skim coats, etc. In each case, the skilled practitioner would readily recognize that the textile component could be formed and arranged or otherwise adapted within the scope of the present invention as limited only by the appended claims, to impart sufficient distortion for a given application.

By introducing such imbalance through fiber loading a rubber composite used to skim-coat a fabric component in one or more rubberized textile members, one can furthermore reduce the coefficient of friction of such layers in either the compression section's outer portion 20, or the tension section's outer portion 24 if utilized therein, which further facilitates a delay or softening of the clutching action and engagement of the belt with the pulley groove. In addition, fiber loading of the skim rubber as provided in such embodiment of the present invention enhances the abrasion resistance of the rubberized textile members compared to conventional configurations, which is particularly significant at the edges of the rubberized textile member, where it contacts the pulley groove while the belt is engaged in the clutching drive system. It is believed that such increased abrasion resistance leads to a concomitantly prolonged pulley-to-sidewall fit, and thus an increased service life expectancy. It has furthermore been found that fiber loading of the skim rubber in accordance with a preferred embodiment of the present invention results in improved performance of the belt under reverse bending conditions, as indicated in increased resistance to back-bend flex cracking. It should be noted however that while the aforementioned benefits of fiber loading the skim rubber in rubberized textile members may be utilized in one or more layers of the compression section- or tension section outer portions, the above-described structural imbalance is best established and/or maintained by manipulating the textile component in one or more rubberized textile member layers of the compression section's outer portion to establish the structural imbalance.

As one skilled in the art would readily appreciate, the previously described sectional undercord bending distortion and corresponding delay in drive engagement is also related to the respective pulley groove and V-belt sidewall angles, and the cross-sectional geometry of the V-belt, including its top width and breadth. For the example described above and illustrated in FIG. 1, the particular V-belt included a sidewall angle of at least 8 degrees greater than that of the included pulley angle, and was categorized as an American National Standard "B"-type belt (ANSI/RMA/IP-20-1988). In general, belts made in accordance with the provisions of the present invention are anticipated to effectively operate and provide beneficial clutching action in clutching drive assemblies such as illustrated in FIG. 4, wherein the included pulley angle is from about 20 to 60 degrees, is more preferably from about 26 to 45 degrees, and is most preferably from about 34–40 degrees.

To form the directionally-orientated fiber-loaded rubberized textile member layer of a preferred embodiment of the present invention, in which at least a significant number of the fibers are orientated in a direction distinct from both the run direction of the belt and its transverse, and which may be the same or different from the direction of the warp yarn in the fabric element, any conventional and/or suitable method may be employed, such as a calendaring process wherein a rubber compound is forced between the spaces of the constituent yarns or threads, such as the warps and wefts in the case of a woven fabric, while providing the desired thickness of rubber, indicated at 52 in FIG. 3, on each side of each layer. According to the present invention however, the rubber compound would be suitably fiber-loaded as described above. Calendering such fiber-loaded stock has the beneficial consequence of urging at least a substantial proportion of the at least semi-linear fibers into general alignment with the direction of the calendar, i.e., generally in the direction of the fabric's warp. Suitably proportioned sections of such fiber-loaded rubber-skimmed fabric may then be cut for further incorporation in the V-belt. For example, at least one but preferably three or more so-formed rubberized textile members may be stacked one upon the other to form an alternating arrangement of fiber-loaded-rubber- and fabric layers, preferably wherein a greater amount of the textile component is orientated in a direction other than the direction of travel of the belt, or its transverse. This assembly then forms at least the outer portion of the undercord, or compression section of the belt. It may be incorporated into the belt structure for example by conventional methods.

For non-castable elastomer-based belts, such steps may include for example placing multiple plies of the fiber-loaded skim-coated fabric onto a belt-building drum; applying other associated layers of, e.g., unvulcanized elastomer, tensile cord, adhesion gum, additional non-orientated rubberized textile members, to the fabric; vulcanizing the assembly; and cutting and/or skiving appropriate individual V-belt profiles. For castable elastomer-based belts, such steps may include for example placing such multiple plies of fiber-loaded skim-coated fabric into a belt-forming mold; placing other associated layers of, e.g., tensile cord, adhesion gum, additional non-orientated rubberized textile members, into the mold adjacent the fabric; introducing molten castable elastomer and thereafter curing the assembly and removing the finished belt from the mold.

Although the present invention has been described in detail for the purpose of illustration, it is to be understood that such detail is solely for that purpose and that variations can be made therein by one skilled in the art without departing from the spirit or scope of the present invention except as it may be limited by the appended claims. The invention disclosed herein may suitably be practiced in the absence of any element not specifically disclosed herein.

What is claimed is:

1. A V-belt suitable for use in a clutching drive assembly, comprising a belt body having a compression section and a tension section; at least one longitudinally extending tensile element disposed between said sections; said compression section having an inner portion and an outer portion, at least said outer portion comprising at least three layers of a rubberized textile member, said rubberized textile members each comprising a textile component and a rubber component, and characterized in that at least a greater proportion by weight of said textile component is orientated in a first direction other than both the direction of travel of the belt and a direction transverse thereto, said proportion being sufficient to establish in the belt a structural imbalance whereby said belt exhibits bending distortion characteristics in engaging with said clutching drive.

2. The V-belt of claim 1 further characterized in that said rubber component comprises a rubber skim coat disposed on at least a portion of said textile component, and said textile component is selected from the group consisting of:
   a) Woven fabrics;
   b) Knitted fabrics;
   c) Non-woven fabrics;
   d) Yarn;
   e) Yarn intermediates;
   f) Cord;
   g) Braid;
   h) Fibers;
   i) Filaments: and
   j) Combinations of two or more of the foregoing.

3. The V-belt of claim 2 further characterized in that said textile component comprises a combination of said woven fabric and said fibers, said fibers are dispersed in said rubber skim coat; said rubber skim coat is disposed on at least one surface of said woven fabric, and at least a greater proportion of the total amount of said fibers are formed and arranged within said rubber skim coat to lie substantially in said first direction.

4. The V-belt of claim 3 wherein said woven fabric comprises at least one warp yarn and at least one weft yarn, said warp yarn lying in a direction at an angle of from 100 to 130 degrees to the direction of said weft yarn.

5. The V-belt of claim 4 wherein said direction of said warp yarn is at an angle of from 15 to less than 90 degrees to the direction of travel of said V-belt.

6. The V-belt of claim 5 wherein said greater proportion of the total amount of said fibers is orientated in a direction that is within 20 degrees of said direction of said warp yarn.

7. The V-belt of claim 3 wherein said woven fabric is formed and arranged to be on a bias.

8. The V-belt of claim 3 wherein said fibers are at least semi-linear in configuration and are of a material selected from:
   a) cotton;
   b) polyester;
   c) aramid;
   d) nylon;
   e) fiberglass; and
   f) a combination of any two or more of the foregoing.

9. A clutching drive assembly comprising the belt of claim 1, a driver pulley, a driven pulley and a clutching member.

10. A V-belt suitable for use in a clutching drive assembly, comprising a belt body having a compression section and a tension section; at least one longitudinally extending tensile element embedded in said tension section; said compression section comprising an outer portion and an inner portion, and characterized in that said outer portion comprises at least three layers of a fiber-loaded rubberized bias-fabric member, said fiber-loaded rubberized bias-fabric member comprising a bias-fabric member comprising at least one warp yarn and at least one weft yarn, said warp yarn lying at an angle of from 40 to 80 degrees to the longitudinal direction of the belt, and a fiber-loaded rubber skim coat; said fiber-loaded rubber skim coat comprising an elastomeric component and a plurality of fibers; and wherein at least a portion of said fibers lie in direction within 10 degrees of said direction of said warp yarn direction.

* * * * *